United States Patent
Kannan et al.

(10) Patent No.: US 11,411,750 B2
(45) Date of Patent: Aug. 9, 2022

(54) PERSONAL UNCLONNABLE FUNCTION

(71) Applicant: Seagate Technology LLC, Cupertino, CA (US)

(72) Inventors: Padmaja Kannan, Singapore (SG); Xiong Liu, Singapore (SG); Jiangnan Lin, Singapore (SG); Wendy Pui Lai Wong, Singapore (SG)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 0 days.

(21) Appl. No.: 16/834,867

(22) Filed: Mar. 30, 2020

(65) Prior Publication Data

US 2021/0306165 A1    Sep. 30, 2021

(51) Int. Cl.
| | |
|---|---|
| *H04L 9/32* | (2006.01) |
| *G06F 21/32* | (2013.01) |
| *H04L 9/08* | (2006.01) |
| *G06V 40/10* | (2022.01) |

(52) U.S. Cl.
CPC .......... *H04L 9/3278* (2013.01); *G06F 21/32* (2013.01); *G06V 40/10* (2022.01); *H04L 9/3231* (2013.01)

(58) Field of Classification Search
CPC ... H04L 9/3278; H04L 9/3231; H04L 9/0866; H04L 9/08; H04L 9/32; G06F 21/32; G06K 9/00885
See application file for complete search history.

(56) References Cited

U.S. PATENT DOCUMENTS

| | | | |
|---|---|---|---|
| 10,242,171 B2 * | 3/2019 | Liu .......................... | G06F 21/32 |
| 2007/0017136 A1 | 1/2007 | Mosher, Jr. et al. | |
| 2007/0186923 A1 * | 8/2007 | Poutiatine ............. | A61J 7/0038 |
| | | | 128/200.14 |
| 2009/0296994 A1 * | 12/2009 | Zhang ................ | G06K 9/00885 |
| | | | 382/115 |
| 2010/0017618 A1 * | 1/2010 | Golic ................. | G06K 9/00288 |
| | | | 713/186 |
| 2012/0272713 A1 | 11/2012 | Kountotsis et al. | |
| 2014/0165698 A1 | 6/2014 | Mochizuki et al. | |
| 2014/0207467 A1 | 7/2014 | White et al. | |
| 2018/0276443 A1 * | 9/2018 | Strohmann .......... | G06K 9/0002 |
| 2020/0092116 A1 * | 3/2020 | Nguyen ................ | H04L 9/0866 |

FOREIGN PATENT DOCUMENTS

| | | | | |
|---|---|---|---|---|
| CN | 105335719 A | * | 2/2016 | |
| CN | 105391682 B | * | 4/2020 | ........ H04L 63/0861 |
| JP | 2016198141 A | * | 12/2016 | |
| WO | WO-2017040867 A1 | * | 3/2017 | ............. G06F 21/32 |

\* cited by examiner

*Primary Examiner* — Jayesh M Jhaveri
(74) *Attorney, Agent, or Firm* — Holzer Patel Drennan

(57) ABSTRACT

The technology disclosed herein provides a system for generating a personal unclonable function (PUF) for a user based on a biometric data related to the user. Implementations of the system include a camera to generate a partial image of a user's tongue, a sensor to generate a moisture level in the user's saliva, a PUF generator configured to generate a PUF benchmark of the user based on combination of the partial image of a user's tongue and the moisture level in the user's saliva, and an access control unit configured to control access to one or more user devices based on the PUF benchmark.

19 Claims, 5 Drawing Sheets

PERSONAL UNCLONNABLE FUNCTION

BACKGROUND

A password is a string of characters used for user authentication to prove identity or access approval to gain access to resource such as PC, Laptop, external drive, etc. For security reasons, users are generally required to enter their password for devices and/or systems. Furthermore, many systems require users to often change their password at predetermined intervals. Given the large number of devices and systems used by modern consumers, they end up remembering a large number of different passwords. Often the users use the same or simple passwords, such as date of birth, etc., for login and these in fact makes the password based login to systems and devices less secure.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following, more particular written Detailed Description of various implementations as further illustrated in the accompanying drawings and defined in the appended claims.

In at least one implementation, a technology disclosed herein provides a system for generating a personal unclonable function (PUF) for a user based on a biometric data related to the user. Implementations of the system include a camera to generate a partial image of a user's tongue, a sensor to generate a moisture level in the user's saliva, a PUF generator configured to generate a PUF benchmark of the user based on combination of the partial image of a user's tongue and the moisture level in the user's saliva, and an access control unit configured to control access to one or more user devices based on the PUF benchmark.

These and various other features and advantages will be apparent from a reading of the following Detailed Description.

BRIEF DESCRIPTIONS OF THE DRAWINGS

A further understanding of the nature and advantages of the present technology may be realized by reference to the figures, which are described in the remaining portion of the specification. In the figures, like reference numerals are used throughout several figures to refer to similar components. In some instances, a reference numeral may have an associated sub-label consisting of a lower-case letter to denote one of multiple similar components. When reference is made to a reference numeral without specification of a sub-label, the reference is intended to refer to all such multiple similar components.

DETAILED DESCRIPTION

Implementations described herein provide a system for managing login and access to devices by users without requiring passwords. The proposed invention suggests creating personal unclonable function (PUF) for users based on various information about the users and allowing access to devices upon receipt and verification of such PUF. In one implementation, the system disclosed herein allows generating a PUF for a user based on combination of biometric prints collected from one or more non-invasive devices. For example, such non-invasive devices may include a breathanalyzer to capture an analyze the user's breath and a camera to capture image of the user's tongue.

Figure 1:
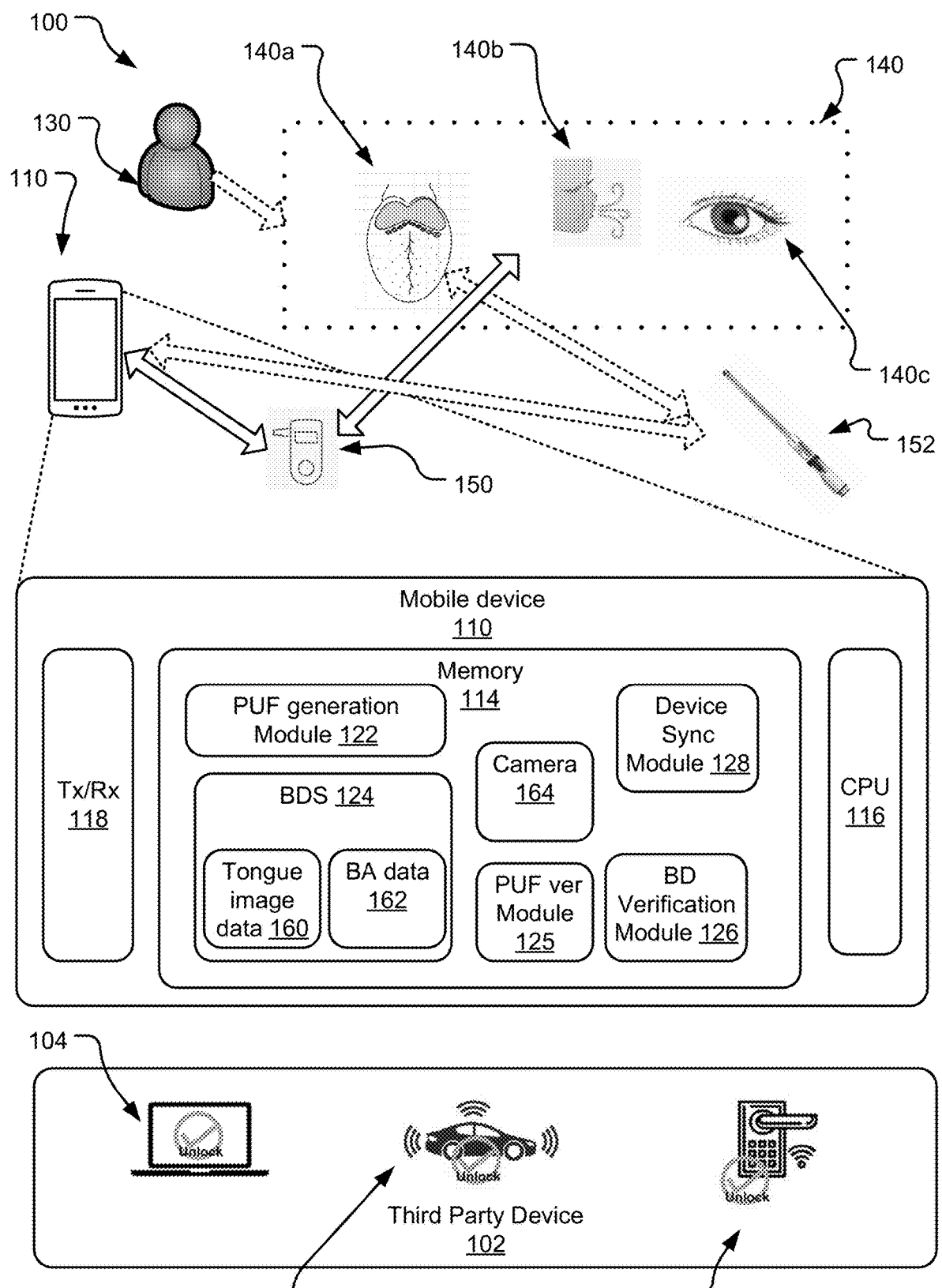
FIG. 1 illustrates an example block diagram of an example system for generating a personal unclonable function for a user.

FIG. 1 illustrates an example PUF system 100 that allows generating a PUF for a user 130 based on various biometric inputs collected from the user 130. The PUF system 100 may be implemented using a user's 130 mobile device 110, such as a mobile phone, a tablet device, smartwatch, etc. The mobile device 110 may include a memory 114 for storing various operations and data that can be used for implanting the PUF system 100. For example, the memory 114 may include a PUF generation module 122 that can be used to generate a PUF for the user 130 using various biometric data about the user 130. In one implementation, the PUF generation module 122 may generate a personal unclonable function (PUF) value based on a partial image of the user's 130 biometric data 140.

The biometric data 140 may include a partial image of the user's tongue 140*a*, a sample of the user's breath 140*b*, an image of the user's retina 140*c*, etc. Specifically, the mobile device 110 may have a camera 164 that can be used to take the partial image of the user's tongue 140*a* and well as an image of the retina 140*c*. A breath analyzer 150 may be used to take the user's breath sample 140*b*. The breath analyzer 150 may be communicatively connected to the camera 110 to send breath analyzer data 162 to be stored in a biometric data store 124 in the memory 114. The biometric data store 124 may also store the image of the tongue as part of tongue data 160. An electrode sensor 152 may be used to detect bioelectrical signals from the user's tongue 140*a*. The electrode sensor 152 may be made of any conductive material that generates the bioelectrical signals from various parts of the user's tongue 140*a*. Such bioelectrical signals are also stored as part of the tongue data 160. The electrode sensor 152 may be communicatively coupled to the mobile device 110 (via wireless or similar) to communicate the bioelectrical signals to the mobile device 110.

In one implementation, the mobile device 110 may communicate using a transmitter/receiver (Tx/Rx) module 118 to communicate with various biometric data generating objects 150, 152 of the user 130 to collect various biometric data about the user 130. For example, the transmitters used by the biometric data generating objects 150, 152 may be Bluetooth transmitters, Bluetooth low energy (BLE) transmitters, etc. In one implementation, upon activation of the mobile device 110, it may establish communications with one or more of the various biometric data generating objects 150, 152 and requests current biometric data, such as the latest breath analyzer output, tongue bioelectrical signals, tongue image, etc.

The mobile device 110 may also include a biometric data verification module 126 that compares the current biometric data collected from the biometric data generating objects 150, 152 with the existing biometric data about the user. In one implementation, if the current biometric data is different from the data stored in the BDS 124, the mobile device 110 may take one or more action to ascertain that the biometric data collection objects 150, 152 are actually used by the user 130 that is related to the mobile device 110. For example, if the bioelectrical signals communicated by the electrode sensor 152 does not match the bioelectrical signals stored in the BDS 124, the mobile device 110 may generate a pop-up message to the user 130 on the mobile device 110. Alternatively, the mobile device 110 may send a secure message to the user 130 via a text message, an email, etc. to notify the user 130 of the discrepancy in the biometric data collected from the biometric data collection objects 150, 152.

The mobile device 110 may also include a PUF generation module 122 that generates a PUF of the user 130 using the biometric data. In one implementation, the PUF generation module 122 may be configured such that it uses biometric data from at least n number of biometric data generation objects 150, 152, where n may be a number that can be selected by the user 130. For example, the PUF may be generated as a hash of the breath sample 140b of the user 130 and the tongue image 140a of the user 130 such that the hash uniquely identifies the user 130. Alternatively, another PUF may be generated based on the breath sample 140b of the user 130 and the bioelectrical signals of the tongue 140a of the user 130 as collected by the electrode sensor 152.

Additionally, the mobile device 110 may also include a device synchronization module 128 that syncs the mobile device 110 with the biometric data generation objects 150, 152 through wireless methods such as Bluetooth, near field communication (NFC), etc., and maintains a user biometrics data Checklist. Furthermore, each of the biometric data generation objects 150, 152 may regularly verify user 130's biometric information at predetermined time intervals and report the verification state to mobile device 110 via the device synchronization module 128.

Additionally, the device synchronization module 128 may also wirelessly sync the mobile device 110 with third party device 102 like a laptop 104, a smart car 106, a smart-door 108, etc. Other such third party devices 102 may include a personal computer, an external HDD/SSD, etc. In alternative implementation, the memory 114 may also include a PUF verification module 125. The PUF verification module 125 may compare the current version of PUF with a benchmark PUF for the user 130. For example, the PUF verification module 125 may have a number of alternative versions of benchmark PUFs for the user 130. In such a case, one of such benchmark PUF may be generated using an element of the user 130's identity and two of the biometric data, such as the tongue image 140a and tongue bioelectrical signals collected by the electrode sensor 152. In an alternative implementation, the benchmark PUF may be generated using the user 130's identity and other two of various user biometric data.

In one implementation, the device synchronization module 128 may sync the third party device 102 with the mobile device 110 upon verifying the user 130's identity by the PUF verification module 125. In one implementation, the device synchronization module 128 may sync the third party device 102 with the mobile device 110 wirelessly or by using a USB cable, a Thunderbolt cable, etc.

In an alternative implementation, a third party device 102 may generate a request to the mobile device 110 to authenticate the user 130 to a website. For example, the laptop 104 may have saved a password for user 130's access to a secure website. In such a case, if the user 130 requests access to a secure website via the laptop 104, the laptop 104 may authenticate the user 130 by sending a user authentication request to the mobile device 110. Subsequently, the mobile device 110 may verify the user 130's PUF and upon successful verification notify the laptop 104 of the user 130's authentication. Subsequently, upon receiving the authentication, the laptop 104 may use the locally stored password to the secure website to give the user 130 access to the secure website without the user 130 having to input the password.

In one implementation, during initiation of a third party device for use with the PUF system 100, the user 130 may need to use a legacy password to associate such third-party device with the mobile device 110 that manages the PUF. For example, the first time the user 130 initiates the laptop 104 with the password-less login system 100, the mobile device 110 may ask the laptop 104 to send a request to the laptop 104 to sync the laptop 104 with the mobile device 110. In response, the user 130 sends a message from the laptop 104 to the mobile device 110 to ascertain that the user in fact has logged onto the device using legacy password based login method. In such as case, the device sync module 128 of the mobile device adds the laptop 104 to the registry of the third party devices that are accessible via password-less login. Once the laptop 104 is sync'd to the mobile device, on subsequent attempts, upon power on for the laptop, the laptop may send a request to the mobile device for providing user access to the laptop.

Figure 2:
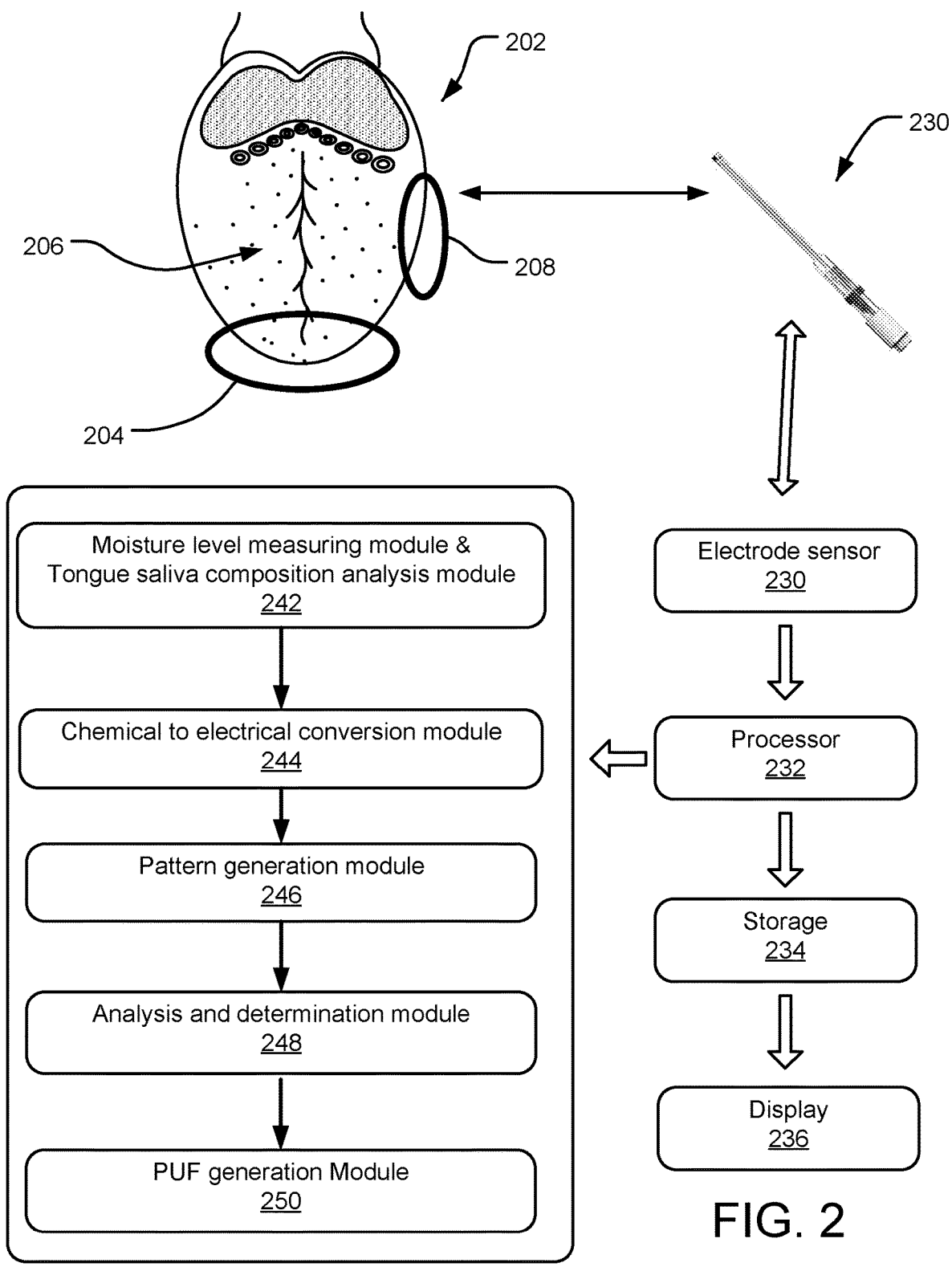
FIG. 2 illustrates example components of a system for using biometrical signals generated from a tongue of a user.

FIG. 2 illustrates components of a system 200 for using biometrical signals generated from a tongue 202 of a user. Specifically, an electrode scanner 230 may be used to detect various biometrical signals from the tongue 202. For example, such biometrical signals may include biometrical signals generated at the tip 204 of the tongue 202, at the dorsum 206 of the tongue 202, at the margin 208 of the tongue 202, etc. Such biometrical signals may include, for example, saliva level on the tongue 202, the components of the saliva of the tongue 202, moisture level in the saliva, etc.

Various biometrical signals collected from the tongue 202 may be communicated to a processor 232. The processor 232 may have various modules to process the biometrical signals generated by the electrode sensor 230. For example, a module 242 may measure the moisture level in saliva and analyze saliva composition. For example, the module 242 may measure levels of sodium, potassium, calcium, magnesium, bicarbonate, chloride, fluoride, thiocyanate, etc. Furthermore, in alternative implementations, it may also determine levels of chemicals that provide lubrication, such as mucins, water, glycoproteins; antimicrobial components, such as amylase, defensins, lysozymes, lactoferrins, etc.

The output of the module 242 may be various chemical signals. These chemical signals may be input to a chemical to electrical conversion module 244 that converts various chemical signals into electrical signals that are input to a pattern recognition module 246. The output of the pattern recognition module 246 is input into an analysis and determination module 248 that determines health condition of the user. As health condition changes induce changes to color, pattern, or shape of tongue 202, in one implementation, the color, texture, shape, pattern, size of tongue 202 may be output by the module 244-248.

Various chemical and electrical parameters of the tongue 202 and their patterns, as determined by the module 244-248 may be used by a PUF generation module 250 to generate a PUF of the user. Specifically, the PUF generator 250 may use various combinations of the chemical and electrical parameters and their patterns, together with other user identifying information to generate PUF for the user such that the PUF uniquely identifies the user. The PUF generated by the PUF generator 250 may be used to provide the user access to various devices, such as a computer, a car, a mobile device, etc.

Furthermore, in one implementation of the system 200, the analysis and determination module 248 also takes into consideration various seasonal and weather conditions when analyzing the chemical and electrical parameters of the tongue 202 and their patterns to account for how these seasonal and weather conditions affect the moisture levels and other components of the saliva. For example, during warm weather, the moisture in the breath condenses to rapidly lower temperature, thus affecting the moisture level in the saliva. Various outputs generated by the processor 232 may be stored in a storage module 234 and displayed on a display module 236.

Figure 3:
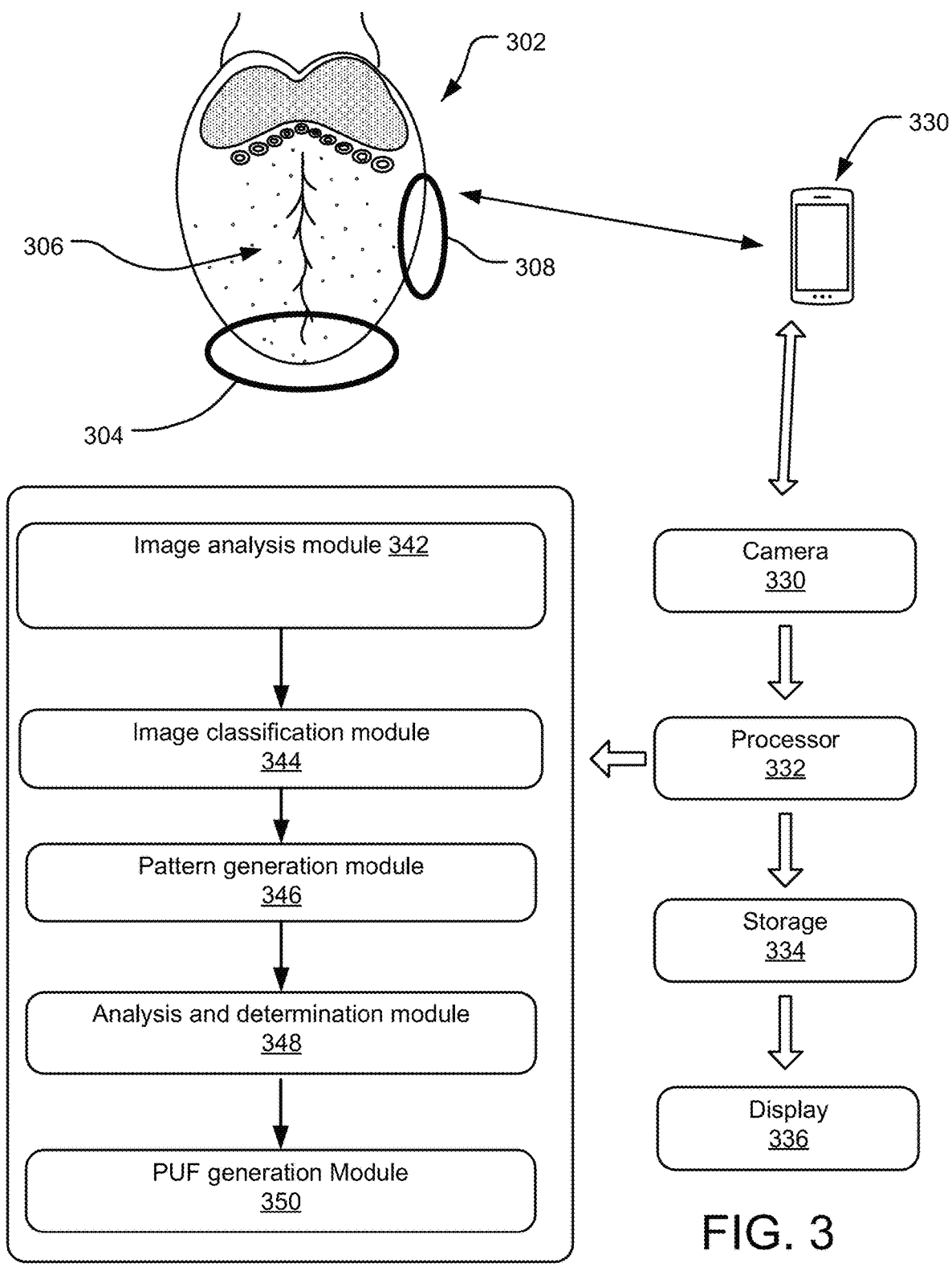
FIG. 3 illustrates example components of a system for using image signals generated from a tongue of a user.

FIG. 3 illustrates components of a system 300 for using image signals generated from a tongue 302 of a user. Specifically, a camera 330 may be used to take various images of the tongue 302. For example, the images may include an image generated at the tip 304 of the tongue 302, an image at the dorsum 306 of the tongue 302, an images at the margin 308 of the tongue 302, images of the underside of the tongue 302, etc.

Various images of the tongue 302 may be communicated to a processor 332. The processor 332 may have various modules to process the images generated by the camera 330. For example, an image analysis module 342 may analyze various images of the tongue 302. The output of the image analysis module 342 may be the tip (apex) shape of tongue, the middle line of the tongue, overall shape, color/color gradient, unique point, etc. The output of the image analysis module 342 may be input to an image classification module 344 that classifies the images into various categories. Example categories may be categorization shape of tongue tip shape being one of arc, flat, double hooks; middle line position of the tongue being one of middle, bias to left, bias to right; middle line width of the tongue being narrow, wide; tongue color being one of pink, red, dark red, etc. The output of the image classification module 344 is input into an analysis and determination module 348 that determines health status, and gender of the person using tongue's lingual apex.

Various image and their patterns, as determined by the module 344-348 may be used by a PUF generation module 350 to generate a PUF of the user. Specifically, the PUF generator 350 may use various combinations of the tongue images, together with other user identifying information to generate PUF for the user such that the PUF uniquely identifies the user. The PUF generated by the PUF generator 350 may be used to provide the user access to various devices, such as a computer, a car, a mobile device, etc.

Furthermore, in one implementation of the system 200, the analysis and determination module 348 also takes into consideration various seasonal and weather conditions when analyzing the images of the tongue 302 and their patterns to account for how these seasonal and weather conditions affect the shape of the tongue 302. For example, during dry weather, the tongue 302 may experience more cracks, affecting the images captured by the camera 330. Various outputs generated by the processor 332 may be stored in a storage module 334 and displayed on a display module 336.

Figure 4:
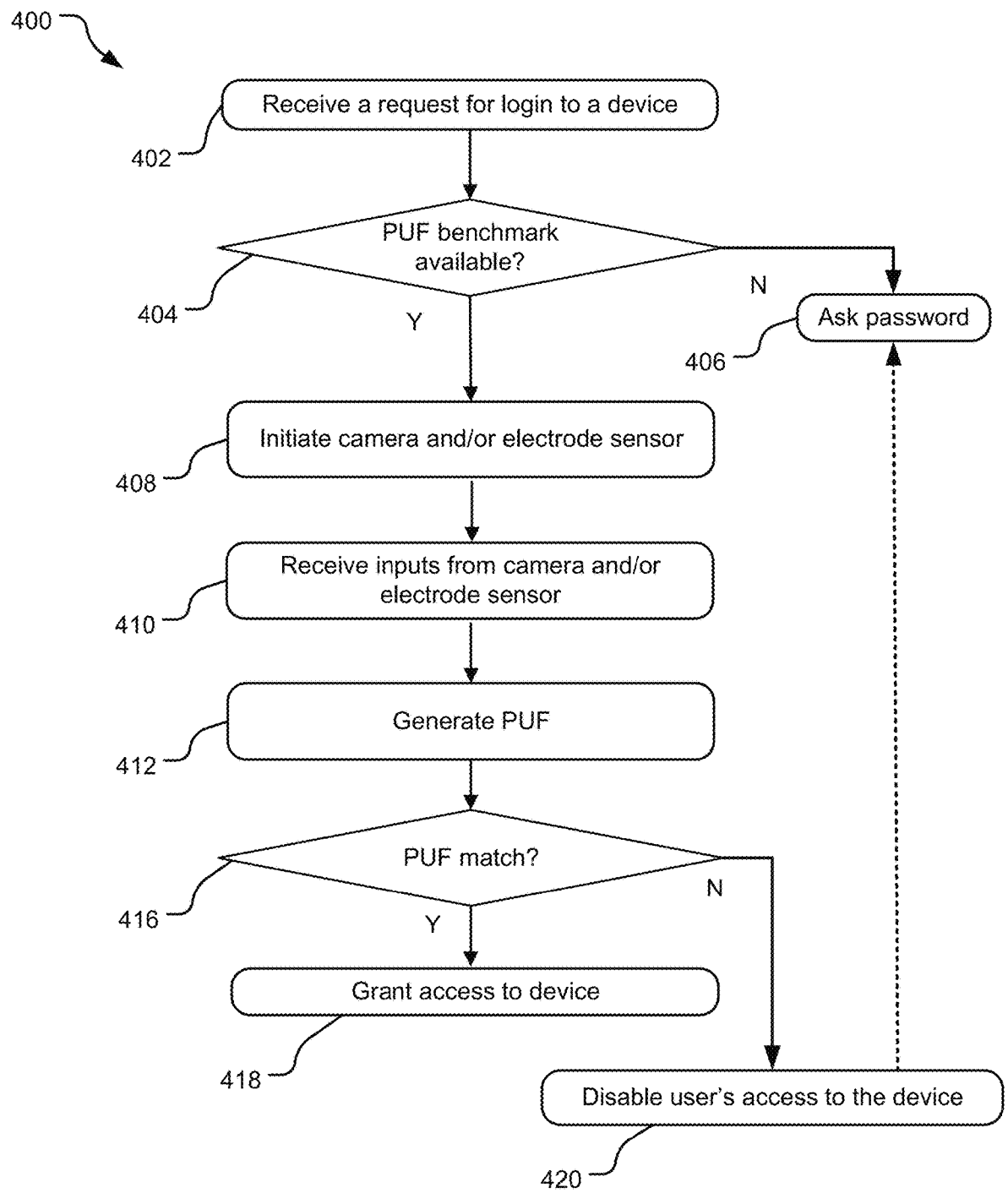
FIG. 4 illustrates example operations for providing logins to one or more devices configured to be accessed by PUF generated as disclosed herein.

FIG. 4 illustrates operations 400 for providing logins to one or more devices configured to be accessed by PUF generated as disclosed herein. Specifically, the operations 400 may be implemented on the mobile device 110 disclosed in FIG. 1. An operation 402 receive a request from a user to login to a third party device. In response, an operation 404 determines if a PUF benchmark is available for the user. If the PUF is not available, an operation 406 communicates with the user to request a password and use the password to give the user access to the device.

If a PUF is available, an operation 408 initiates a camera such as the camera 330 and/or an electrode sensor, such as the electrode sensor 230. subsequently, an operation 410 receives inputs from a camera and/or an electrode sensor. Such inputs may be images of the user's tongue and various biometric signals about the user as collected from the user's tongue. An operation 412 generates a PUF using the inputs received at operation 410.

An operation 416 compares the newly calculated PUF with the user's PUF benchmark and if there is a match, an operation 418 grants the user access to the requested device. If the PUF is not a match, an operation 420 denies the user's access to the device. In one implementation, in response to rejecting the user's access, the operation 420 may transfer the control to operation 406 so that the user can try to access the device using a password. Furthermore, in one implementation, various biometric signals of the user, received at 410 may be evaluated to determine a health condition of the user and in response of determining a medical condition, an alarm may be generated to appropriate authority.

Figure 5:
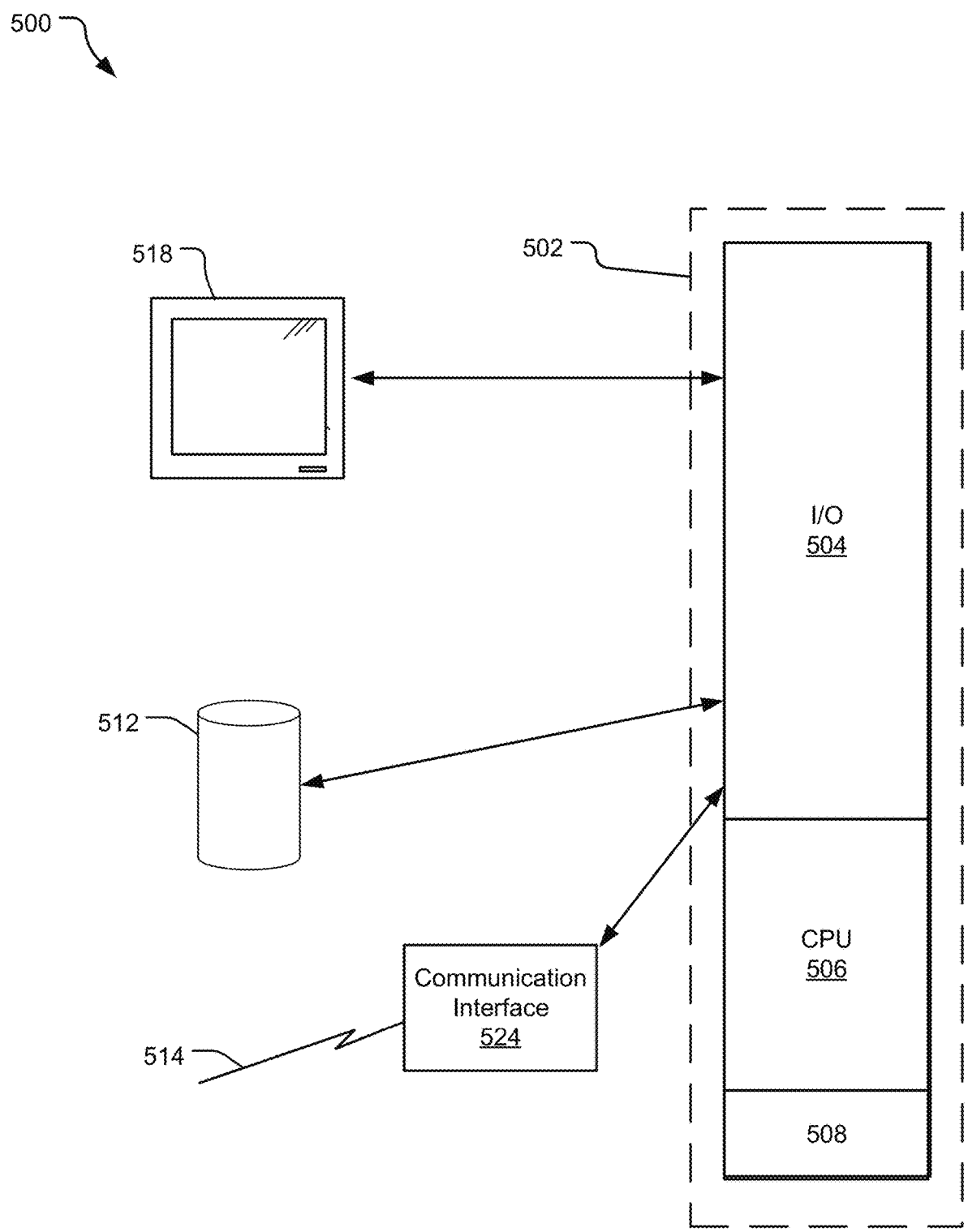
FIG. 5 illustrates an example processing system that may be useful in implementing the described technology.

FIG. 5 illustrates an example processing system 500 that may be useful in implementing the described technology. The processing system 500 is capable of executing a computer program product embodied in a tangible computer-readable storage medium to execute a computer process. Data and program files may be input to the processing system 500, which reads the files and executes the programs therein using one or more processors (CPUs, GPUs, or VPUs). Some of the elements of a processing system 500 are shown in FIG. 5 wherein a processor 502 is shown having an input/output (I/O) section 504, a Central Processing Unit (CPU) 506, and a memory section 508. There may be one or more processors 502, such that the processor 502 of the processing system 500 comprises a single central-processing unit 506, or a plurality of processing units. The processors may be single core or multi-core processors. The processing system 500 may be a conventional computer, a distributed computer, or any other type of computer. The described technology is optionally implemented in software loaded in memory 508, a storage unit 512, and/or communicated via a wired or wireless network link 514 on a carrier signal (e.g., Ethernet, 3G wireless, 8G wireless, LTE (Long Term Evolution)) thereby transforming the processing system 500 in FIG. 5 to a special purpose machine for implementing the described operations. The processing system 500 may be an application specific processing system configured for supporting a distributed ledger. In other words, the processing system 500 may be a ledger node.

The I/O section 504 may be connected to one or more user-interface devices (e.g., a keyboard, a touch-screen display unit 518, etc.) or a storage unit 512. Computer program products containing mechanisms to effectuate the systems and methods in accordance with the described technology may reside in the memory section 508 or on the storage unit 512 of such a system 500.

A communication interface 524 is capable of connecting the processing system 500 to an enterprise network via the network link 514, through which the computer system can receive instructions and data embodied in a carrier wave.

When used in a local area networking (LAN) environment, the processing system 500 is connected (by wired connection or wirelessly) to a local network through the communication interface 524, which is one type of communications device. When used in a wide-area-networking (WAN) environment, the processing system 500 typically includes a modem, a network adapter, or any other type of communications device for establishing communications over the wide area network. In a networked environment, program modules depicted relative to the processing system 500 or portions thereof, may be stored in a remote memory storage device. It is appreciated that the network connections shown are examples of communications devices for and other means of establishing a communications link between the computers may be used.

In an example implementation, a user interface software module, a communication interface, an input/output interface module, a ledger node, and other modules may be embodied by instructions stored in memory 508 and/or the storage unit 512 and executed by the processor 502. Further, local computing systems, remote data sources and/or services, and other associated logic represent firmware, hardware, and/or software, which may be configured to assist in supporting a distributed ledger. A ledger node system may be implemented using a general-purpose computer and specialized software (such as a server executing service software), a special purpose computing system and specialized software (such as a mobile device or network appliance executing service software), or other computing configurations. In addition, keys, device information, identification, configurations, etc. may be stored in the memory 508 and/or the storage unit 512 and executed by the processor 502.

The processing system 500 may be implemented in a device, such as a user device, storage device, IoT device, a desktop, laptop, computing device. The processing system 500 may be a ledger node that executes in a user device or external to a user device.

Data storage and/or memory may be embodied by various types of processor-readable storage media, such as hard disc media, a storage array containing multiple storage devices, optical media, solid-state drive technology, ROM, RAM, and other technology. The operations may be implemented processor-executable instructions in firmware, software, hard-wired circuitry, gate array technology and other technologies, whether executed or assisted by a microprocessor, a microprocessor core, a microcontroller, special purpose circuitry, or other processing technologies. It should be understood that a write controller, a storage controller, data write circuitry, data read and recovery circuitry, a sorting module, and other functional modules of a data storage system may include or work in concert with a processor for processing processor-readable instructions for performing a system-implemented process.

For purposes of this description and meaning of the claims, the term "memory" means a tangible data storage device, including non-volatile memories (such as flash memory and the like) and volatile memories (such as dynamic random-access memory and the like). The computer instructions either permanently or temporarily reside in the memory, along with other information such as data, virtual mappings, operating systems, applications, and the like that are accessed by a computer processor to perform the desired functionality. The term "memory" expressly does not include a transitory medium such as a carrier signal, but the computer instructions can be transferred to the memory wirelessly.

In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

The embodiments of the invention described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, unless explicitly claimed otherwise or a specific order is inherently necessitated by the claim language.

The above specification, examples, and data provide a complete description of the structure and use of example embodiments of the disclosed technology. Since many embodiments of the disclosed technology can be made without departing from the spirit and scope of the disclosed technology, the disclosed technology resides in the claims hereinafter appended. Furthermore, structural features of the different embodiments may be combined in yet another embodiment without departing from the recited claims.

What is claimed is:

1. A system comprising:
   a camera to generate a partial image of a user's tongue;
   an electrode sensor to generate one or more biometric signals from the user's saliva; and
   a PUF generator configured to generate a personal unclonable function (PUF) benchmark of the user based on at least one of the partial image of a user's tongue and the one or more biometric signals generated from the user's saliva, wherein the PUF generator is further configured to receive current weather condition and to analyze the partial image and shape of a user's tongue in view of the current weather condition and modify the PUF based on the analysis of the partial image and shape of a user's tongue in view of the current weather condition;
   wherein the system is configured to control access to one or more user devices based on the PUF benchmark.

2. The system of claim 1, further configured to:
   receive an access request for one of the user devices from a requestor;
   receive one or more biometric signals from the requestor's saliva from the electrode sensor;
   generate a requestor personal unclonable function (PUF) value based on the one or more biometric signals from the requestor's saliva; and
   verify the requestor's identity by comparing the requestor PUF value to the PUF benchmark.

3. The system of claim 2, wherein the system is further configured to receive current weather condition and to modify the requestor PUF based on the weather condition before comparing the requestor PUF value to the PUF benchmark.

4. The system of claim 2, wherein the one or more biometric signals generated from the user's saliva include levels of at least one of sodium, potassium, calcium, magnesium, bicarbonate, chloride, fluoride, and thiocyanate, the system being further configured to generate the NH benchmark and the requestor PUF value based on the various biometric signals.

5. The system of claim 4, wherein the one or more biometric signals generated from the user's saliva include levels of chemicals that provide lubrication, the system being further configured to generate the PUF benchmark and the requestor PUF value based on the levels of chemicals that provide lubrication.

6. The system of claim 2, wherein the system is further configured to:
receive an access request for one of the user devices from a requestor;
receive a partial image of a requestor's tongue from a camera;
generate a requestor personal unclonable function (PUF) value based on the partial image of a requestor's tongue; and
verify the requestor's identity by comparing the requestor PUF value to the PUF benchmark.

7. The system of claim 6, wherein the system is further configured to modify the requestor PUF based on the effect of the weather condition on the shape of the tongue before comparing the requestor PUF value to the PUF benchmark.

8. The system of claim 6, further comprising an image classification module configured to classify the wherein the partial image of a requestor's tongue into one or more categories based on at least one of shape of tongue tip, middle line position of the tongue, and middle line width of the tongue, the system being further configured to generate the PUF benchmark and the requestor PUF value based on the classification.

9. One or more non-transitory processor-readable storage media encoding processor-executable instructions for executing on a computer system a computer process, the computer process comprising:
receiving a partial image of a user's tongue from a camera;
receiving one or more biometric signals from the user's saliva from an electrode sensor;
generating a personal unclonable function (PUF) benchmark of the user based on at least one of the partial image of a user's tongue and the one or more biometric signals generated from the user's saliva;
receiving current weather condition and to analyze the partial image and shape of a user's tongue in view of the current weather condition;
modifying the PCF based on the analysis of the partial image and shape of a user's tongue in view of the current weather condition; and
associating the PUF benchmark of the user to one or more user devices to control access to the one or more user devices.

10. The one or more non-transitory processor-readable storage media of claim 9, wherein the computer process further comprising:
receiving an access request for one of the user devices from a requestor;
receiving one or more biometric signals from the requestor's saliva from the electrode sensor;
generating a requestor personal unclonable function (PUF) value based on the one or more biometric signals from the requestor's saliva; and
verifying the requestor's identity by comparing the requestor PUF value to the PUF benchmark.

11. The one or more non-transitory processor-readable storage media of claim 10, wherein the computer process further comprising granting the requestor access to the one or more user devices in response to verifying the requestor's identity.

12. The one or more non-transitory processor-readable storage media of claim 10, wherein the computer process further comprising modifying the requestor PUF based on the effect of the weather condition on the shape of the tongue before comparing the requestor PUF value to the PUF benchmark.

13. The one or more non-transitory processor-readable storage media of claim 10, wherein the computer process further comprising detecting a medical condition of the requestor based on one or more biometric signals from the requestor's saliva and generating an alert in response to detecting the medical condition of the requestor.

14. A method, comprising:
receiving a partial image of a user's tongue from a camera;
receiving one or more biometric signals from the user's saliva from an electrode sensor;
generating a personal unclonable function (PUF) benchmark of the user based on at least one of the partial image of a user's tongue and the one or more biometric signals generated from the user's saliva;
receiving current weather condition and to analyze the partial image and shape of a user's tongue in view of the current weather condition;
modifying the PCF based on the analysis of the partial image and shape of a user's tongue in view of the current weather condition; and
associating the PUF benchmark of the user to one or more user devices to control access to the one or more user devices.

15. The method of claim 14, further comprising:
receiving an access request for one of the user devices from a requestor;
receiving one or more biometric signals from the requestor's saliva from the electrode sensor;
generating a requestor personal unclonable function (PUF) value based on the one or more biometric signals from the requestor's saliva; and
verifying the requestor's identity by comparing the requestor PUF value to the PUF benchmark.

16. The method of claim 15, further comprising modifying the requestor PUF based on the effect of the weather condition on the shape of the tongue before comparing the requestor PUF value to the PUF benchmark.

17. The method of claim 16, further comprising granting the requestor access to the one or more user devices in response to verifying the requestor's identity.

18. The method of claim 17, further comprising generating various pattern various patterns based on the one or more biometric signals generated from the user's saliva, wherein generating the PUF benchmark further comprising generating the PUF benchmark based on the various patterns and wherein generating the requestor PUF value further comprising generating the requestor PUF value based on the various patterns.

19. The method of claim 15, further comprising:
receiving an access request for one of the user devices from a requestor;
receiving a partial image of a requestor's tongue from a camera;
generating a requestor personal unclonable function (PUF) value based on the partial image of a requestor's tongue; and
verifying the requestor's identity by comparing the requestor PUF value to the PUF benchmark.

* * * * *